United States Patent
Dugan et al.

(10) Patent No.: US 8,244,719 B2
(45) Date of Patent: Aug. 14, 2012

(54) COMPUTER METHOD AND APPARATUS PROVIDING SOCIAL PREVIEW IN TAG SELECTION

(75) Inventors: Casey Dugan, Medford, MA (US); Michael Muller, Medford, MA (US); Jennifer Thom-Santelli, Ann Arbor, MI (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 12/236,835

(22) Filed: Sep. 24, 2008

(65) Prior Publication Data

US 2010/0077300 A1 Mar. 25, 2010

(51) Int. Cl.
*G06F 17/30* (2006.01)
(52) U.S. Cl. ......... 707/721; 709/204; 707/705; 715/273
(58) Field of Classification Search .................. 707/755, 707/721, 705; 709/204; 715/273
See application file for complete search history.

(56) References Cited

U.S. PATENT DOCUMENTS

| | | | |
|---|---|---|---|
| 6,701,311 | B2 | 3/2004 | Biebesheimer et al. |
| 7,196,621 | B2 | 3/2007 | Kochis |
| 2005/0113066 | A1 | 5/2005 | Hamberg |
| 2005/0131894 | A1* | 6/2005 | Vuong ............................. 707/5 |
| 2006/0004691 | A1* | 1/2006 | Sifry ............................... 707/1 |
| 2007/0112761 | A1* | 5/2007 | Xu et al. ......................... 707/5 |
| 2007/0157105 | A1* | 7/2007 | Owens et al. ................. 715/771 |
| 2008/0189336 | A1* | 8/2008 | Prihodko ................... 707/104.1 |
| 2008/0214152 | A1* | 9/2008 | Ramer et al. ............... 455/414.1 |
| 2008/0282177 | A1* | 11/2008 | Brown et al. ................. 715/763 |
| 2009/0070360 | A1* | 3/2009 | Lyle ............................. 707/102 |
| 2009/0144254 | A1* | 6/2009 | O'Sullivan et al. ............... 707/5 |
| 2009/0234811 | A1* | 9/2009 | Jamil et al. ....................... 707/3 |

FOREIGN PATENT DOCUMENTS

KR 2001009981 2/2001

OTHER PUBLICATIONS

Article entitled "Social Tagging and Self-Tagging for Impression Management" by Muller et al. Nov. 2006.*
Article entitled "Social Tagging Roles: Publishers, Evangelists, Leaders" by Thom-Santelli et al. Apr. 10, 2008.*

(Continued)

*Primary Examiner* — Mahesh Dwivedi
(74) *Attorney, Agent, or Firm* — Hamilton, Brook, Smith & Reynolds, P.C.

(57) ABSTRACT

A computer method and apparatus of social tagging computer resources is disclosed. In the invention method and apparatus, a data store holds social tagging data of previously followed tags throughout a system. In response to end-user indication of a tag candidate, the invention system retrieves from the data store social tagging data about the tag candidate. A tag previewer forms and renders a display of the retrieved social tagging data. The display indicates number of users having interest in (i.e., having followed, searched with, browsed and/or subscribed to) the candidate tag and its variants, and the type of interest. The display may further indicate identities (e.g., email addresses) of these users having such interest. The display may serve as a precommit preview to the end-user during selection of a tag (the candidate) for a given resource. Alternatively, the tag previewer may provide the invention display of social tagging data during end-user browsing as well.

18 Claims, 10 Drawing Sheets

OTHER PUBLICATIONS

Li, R., et al., "Towards Effective Browsing of Large Scale Social Annotations," *WWW 2007/Track: Web Engineering*; 943-952 (2007).
Dumais, S., et al., "Stuff I've Seen: A System for Personal Information Retrieval and Re-Use," *SIGIR 03*: 72-79 (2003).
Tuffield, M.M., et al., "The Semantic Logger: Supporting Service Building from Personal Context," *CARPE' 06*: 55-63 (2006).
Sen, S., et al., "Tagging, Communities, Vocabulary, Evolution," *CSCW' 06*: 181-190 (2006).
Storey, M.A., et al., "Shared Waypoints and Social Tagging to Support Collaboration in Software Development," *CSCW'06*: 195-198 (2006).

\* cited by examiner

COMPUTER METHOD AND APPARATUS PROVIDING SOCIAL PREVIEW IN TAG SELECTION

BACKGROUND

In social-tagging systems, a user may create a tag (freeform, freely-chosen text) that becomes associated with a resource, such as a URL (Uniform Resource Locator) or a URI (Uniform Resource Indicator). Any user of the system may then use that tag to search for associated resources. Examples of such social-tagging systems or social software systems are IBM's Dogear, and Internet services such as Delicio.us and Flickr.

An experienced user of social tagging systems knows that some tags are already in use—i.e., a specific tag has previously been used by that user, or by other users. Users often create tags for known or anticipated audiences. In some cases, users agree (offline) on a tag to be used for specific types of resources. In other cases, users tend to converge on one or more tags that can become anchor points in an on-going, asynchronous collaboration about those tags or about the topics that those tags refer to. In still other cases, the choice of which tag to use is unstructured (i.e., both plural and singular forms, different verb tenses, etc.) and both experienced and inexperienced taggers struggle with that decision.

How are previously written tags used? There are two major mechanisms. Nearly all social-tagging services provide means for tag-based search of their contents. Systems may keep a log of such searches, optionally including a record of which user searched for which tag. Some social-tagging services also provide the ability to subscribe to a tag. A user may select a particular tag, and request a subscription. Subsequently, the user is notified about any new uses of that tag. The notification methods may include email, RSS (Really Simple Syndication) feeds, or other specific means.

SUMMARY

In the current art, while a user is in the process of writing a tag on a resource, it is possible to discover how many other people or which other users have used the same tag in creating their own bookmarks in the social tagging system. However, it is not possible to discover how many users have subsequently used that tag to conduct searches of the tagged resources. A user who is writing a tag may want to know who has searched on that tag, and thus who is likely to follow the tag to the resource. The decision of which form of a tag to apply to a resource (e.g., the tag "blogs" versus "blogging") may be assisted by the knowledge of how many people have previously searched for or have subscribed to that tag. One embodiment of applicants' invention uses search logs and subscriptions to provide that information during tag-entry.

More generally, the present invention addresses the foregoing problems and provides a method and apparatus through which a user of a social-tagging system can obtain a preview of how many other users and/or which other users are likely to be interested in the bookmark or tag that the user is creating.

In embodiments of the present invention, (a) A user is creating a tag (or a bookmark) to be associated with a resource (b) The user specifies or otherwise inputs a candidate tag, on a provisional (i.e., pre-commit) basis. The system retrieves social tagging data and may offer other tags which may be commonly used in searches or the like (generally, inquiries) by others. The system may suggest or filter tags based on context as well.

(c) The user can inquire about further information about users who are interested in retrieved tags.

Information displayed by embodiments of the invention may include:
 How many users (aggregate numbers)
 Which users
  The system provides the identities (email name, username, or other identifier) of those users, optionally including electronic business cards or directory services to learn more about those users
 How users are interested
  Via subscriptions
  Via searches
  Via browses In addition, the user can modify her/his initial list of candidate tags in response to information about other users. Lastly, the user confirms the list of tags (commits the tag and/or bookmark information to the service).

In one embodiment, the present invention provides computer apparatus or system of social tagging of computer resources. The system/apparatus is formed of a data store and a tag previewer coupled to the data store. The data store holds social tagging data on tag inquiries (e.g., searches, browses, and/or subscriptions made to tags) preferably from event logs and subscriptions. The tag previewer is responsive to end user input (indicating, browsing, etc.) of a tag candidate and retrieves from the data store social tagging data about the tag candidate. The tag previewer forms a display of the retrieved information (number count of or names of social tagging system users who have inquired about the tag candidate, etc.). A display member (e.g., monitor) receives the formed display from the tag previewer and renders the display to the end-user.

The retrieved social tagging data about the candidate tag may include social tagging information about variants of the candidate tag. The variants consider plural forms of the candidate tag, singular forms of the candidate tag, alternative spellings, and different grammatical variations (tenses, etc.) of the candidate tag. Stemming techniques known in the art are employed for this purpose.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

For purposes of illustration and not limitation of the present invention, an example embodiment is presented. The present invention is concerned with "tag" or the like use in shared systems, and specifically addresses information about other users of that shared system. That is, the present invention focuses on the social nature of social-tagging, displaying information about the people who have made inquiries (e.g., searches, browses, subscriptions, etc.) that involve a subject tag (or referenced it) and showing social context of a particular tag.

Figure 7:
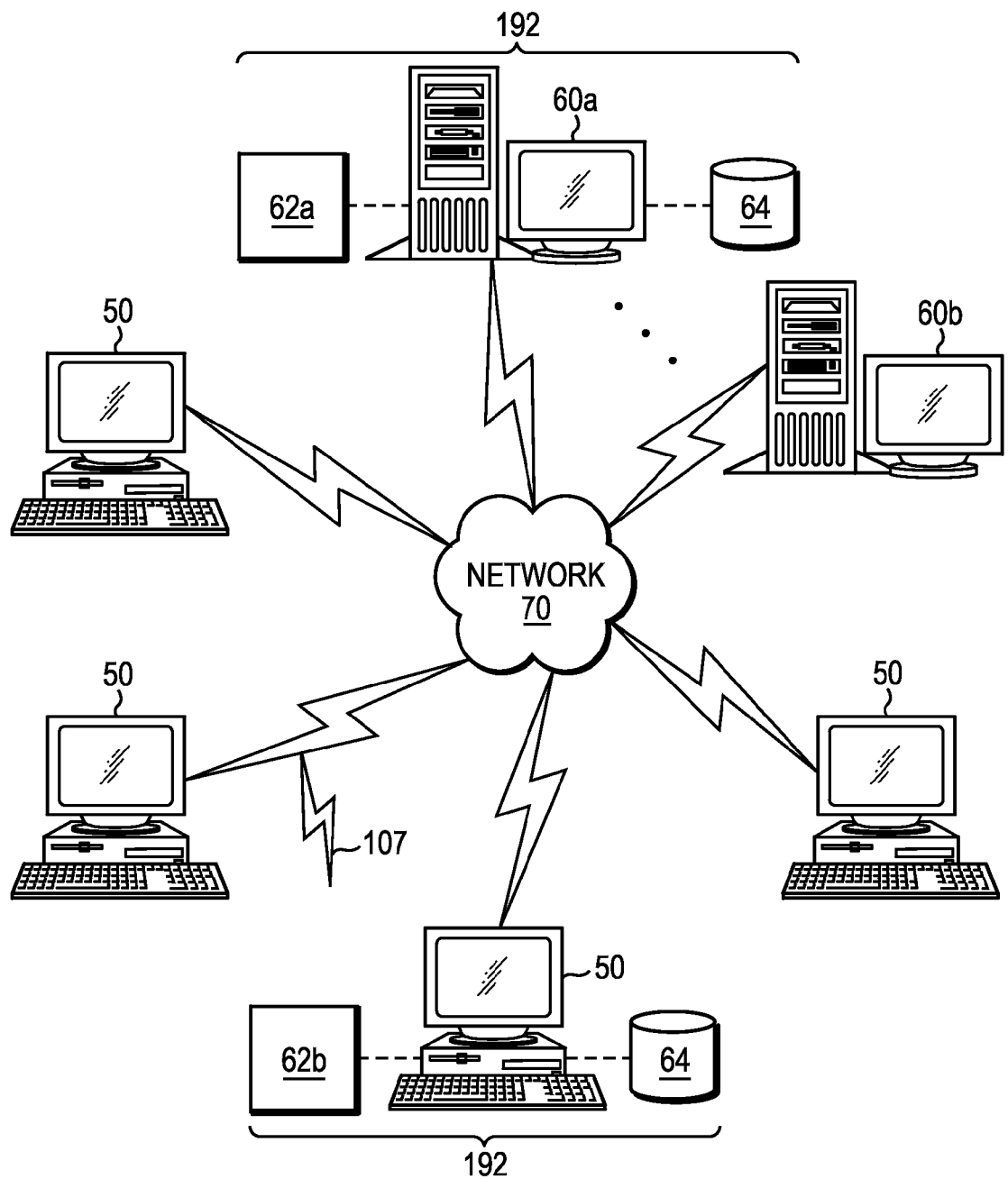
FIG. 7 is a schematic diagram of a computer network in which embodiments of the present invention are implemented.

FIG. 7 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 8:
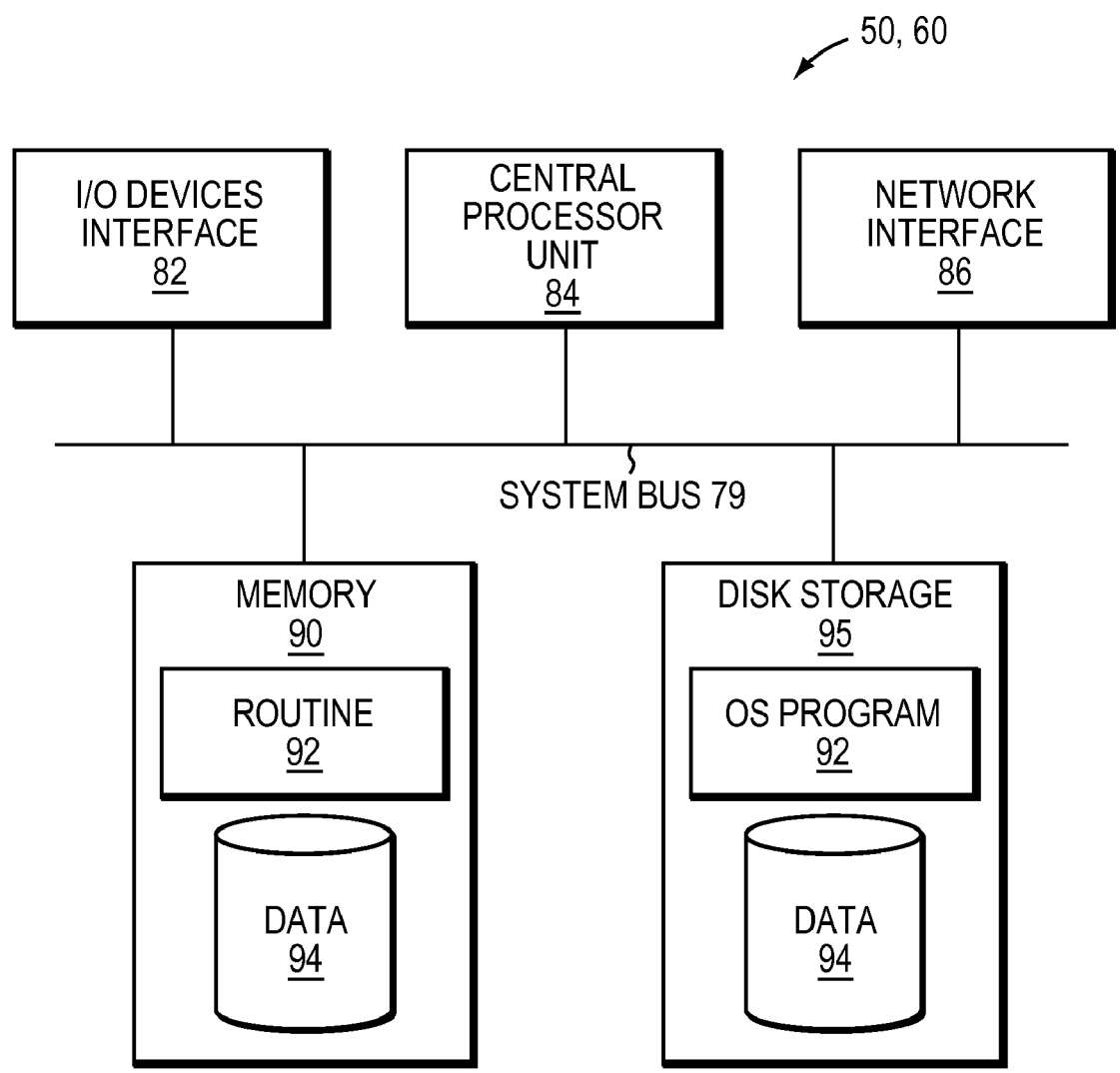
FIG. 8 is a block diagram of a computer node in the network of FIG. 7.

FIG. 8 is a diagram of the internal structure of a computer (e.g., client processor/device 50 or server computers 60) in the computer system of FIG. 7. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 7). Memory 90 provides volatile storage for computer software instructions 92 and data 94 used to implement an embodiment of the present invention (e.g., previewer and supporting code detailed below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In response to user command, the invention system 192 initiates and maintains a browser (or similar communication) session. Known browser or equivalent techniques are employed. For the current session, the system 192 generates and maintains an event log 62a, b (generally 62). Records in the event log 62 include indications of searches, subscriptions, browses and other uses of social tagging. For example, a search record in the event log 62b of a user at client 50 holds search-specific data such as user identifier (name or other indication of person doing the search) and tag searched/inquired on or otherwise employed (involved).

Inquired tags database 64 accumulates and stores/holds tag inquiry information (social tagging data) of the tags in system 192, i.e., as extracted from event logs 62 or otherwise obtained. Included in the tag inquiry or social tagging data are searches on tags, browses on tags, subscriptions to tags and the like. In one embodiment, database system 64 is a relational database system with appropriate engines or modules for extracting social tagging data from event logs 62, for continuously maintaining and updating respective records per tag and for processing search queries on the database 64. Other database systems (data stores) and configurations are suitable.

Each record in inquiries database 64 corresponds to a respective tag. In each record, there is an indication of:
  date and time of the subject (corresponding) tag inquiry;
  type of tag inquiry, i.e., search, browse, subscription, other;
  user who inquired about the tag;
  tag text; and
  optionally URL of the webpage or other link to the resource to which the tag was applied or otherwise corresponds.

In some embodiments, system 192 normalizes the tags for storage of social tagging data in database 64. Normalization may include using all lower case characters in the tag text, singularizing (e.g., removing ending s'), parsing to the root word form or stem, standardizing on a certain verb or grammatical tense, etc. Stemming techniques common in the art are utilized to reduce a tag to its "stem."

Next, embodiments of the invention system 192 index the tags in inquiry database 64 by normalized root word(s)/term or stem. Such indexing enables effectively all forms, versions, or variants (singular/plural, grammatical tense or variation, alternative spelling, etc.) of each tag to be considered and accounted for or otherwise included by the system for search purposes.

In turn, database system 64 enables invention system 192 to search social tagging data and generate a preview of tag information for users during tagging a resource (especially during selection or user-determination of a tag for a resource and prior to committing to this use of the tag). The decision of which form (plural/singular, verb tense, etc.) to apply to a resource may be assisted by the preview presenting how many people and which users have previously searched for or have subscribed to the different forms or versions (variants) of the tag.

For example, the user initially enters "blog" as a candidate tag. The invention previewed 119 responsively displays the variations "blogs" and "blogging" from inquiries database 64 (and event logs 62) and indicates how many users and/or which users have previously inquired about (searched or browsed or subscribed to) these forms of the subject tag. The system 192 may display further pertinent information as well. The displayed information helps the user to determine which version of "blog" (plural, other grammatical tense, etc) has sufficient commonality/popularity or other social "momentum" to take advantage of its use as a tag. The embodiment shown in FIGS. 1-6 is further illustrative.

Figure 1:
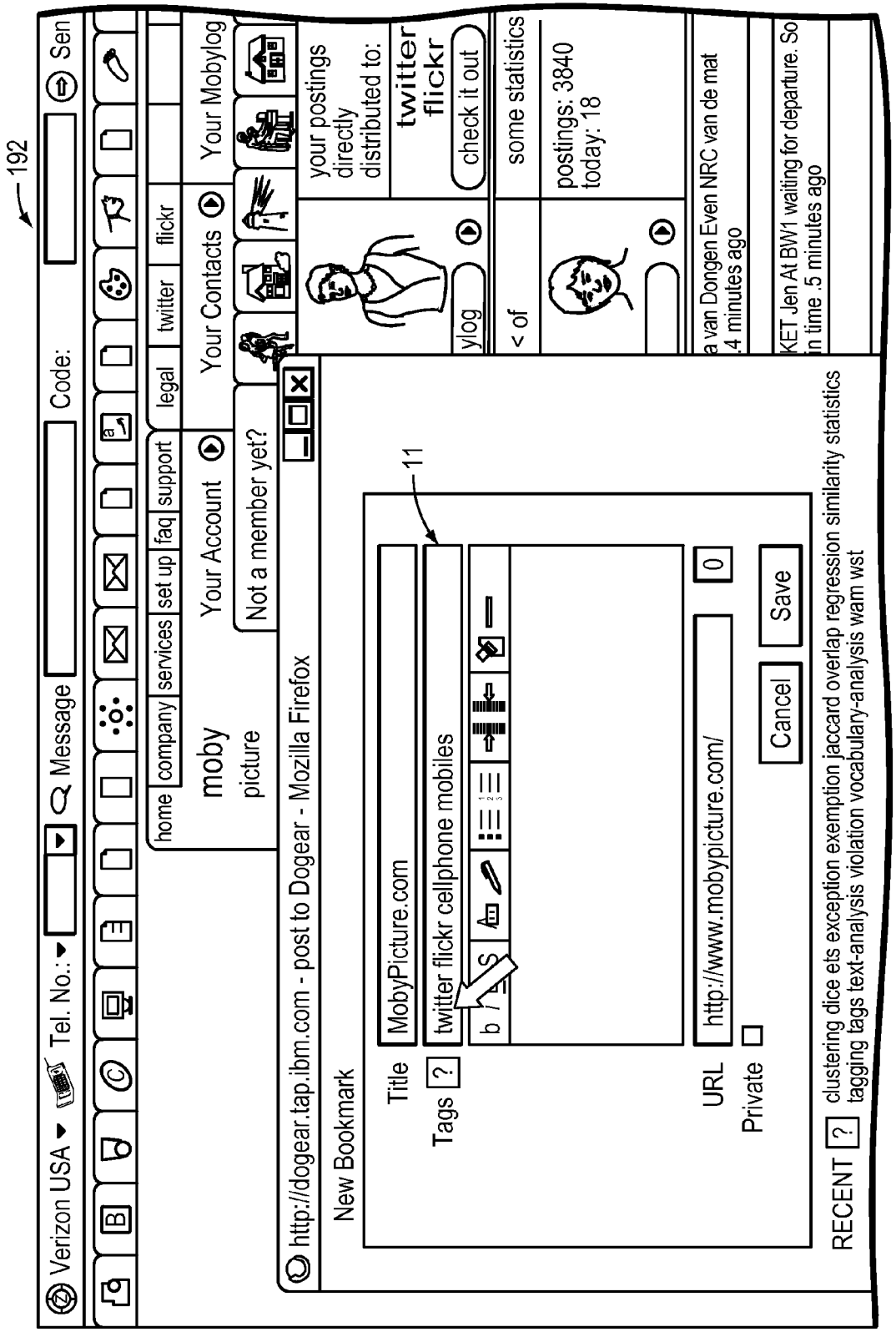
FIGS. 1-6 are schematic illustrations of screen views in a tagging system or operation (process) embodying the present invention.
Figure 2:
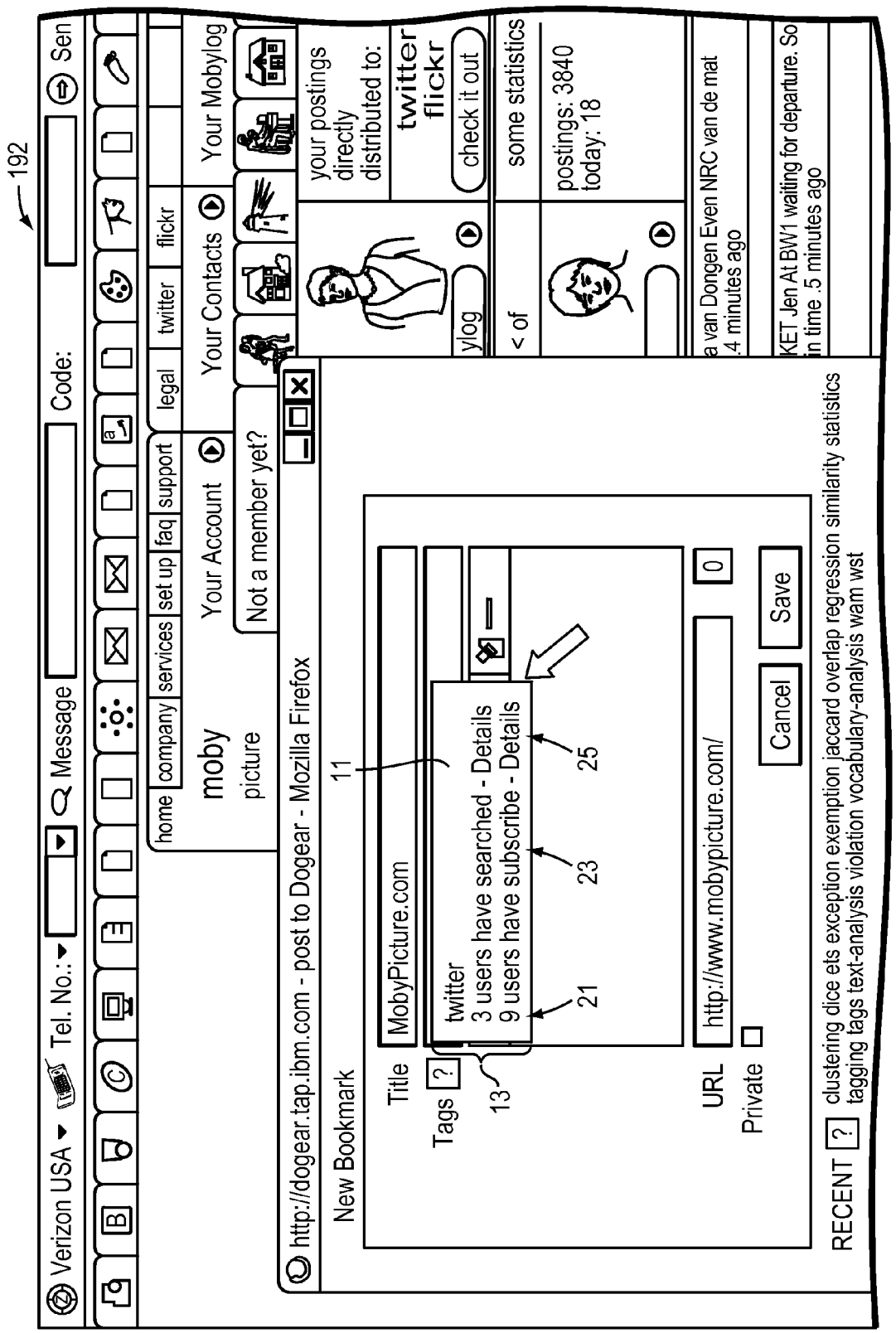

In FIG. 1, a user is entering tags 11 describing a bookmark. Note that the present invention does not require a bookmark structure; the invention system/method 192 can also be used when tags are directly applied to a resource. Continuing with FIG. 1, the user selects a tag 11, and the invention system 192 provides options 13 (via Ajax, or a rich client, or other means/known technology that are outside of the scope of this invention) as shown in FIG. 2.

Optionally, this could happen automatically as the user types (keys in) text of the individual tags (tag candidates) 11.

Some of the options 13 provide information about other users who have referenced this tag 11. As shown in FIG. 2, this displayed information may include, for example, indications of:

How many users (e.g., aggregate numbers) 21,

Which Users 25 (e.g., providing identities of those users, including for example electronic business cards or directory services to learn more about those users), and How the users are interested (via subscriptions, searches, browsers, etc.) 23.

Figure 3:
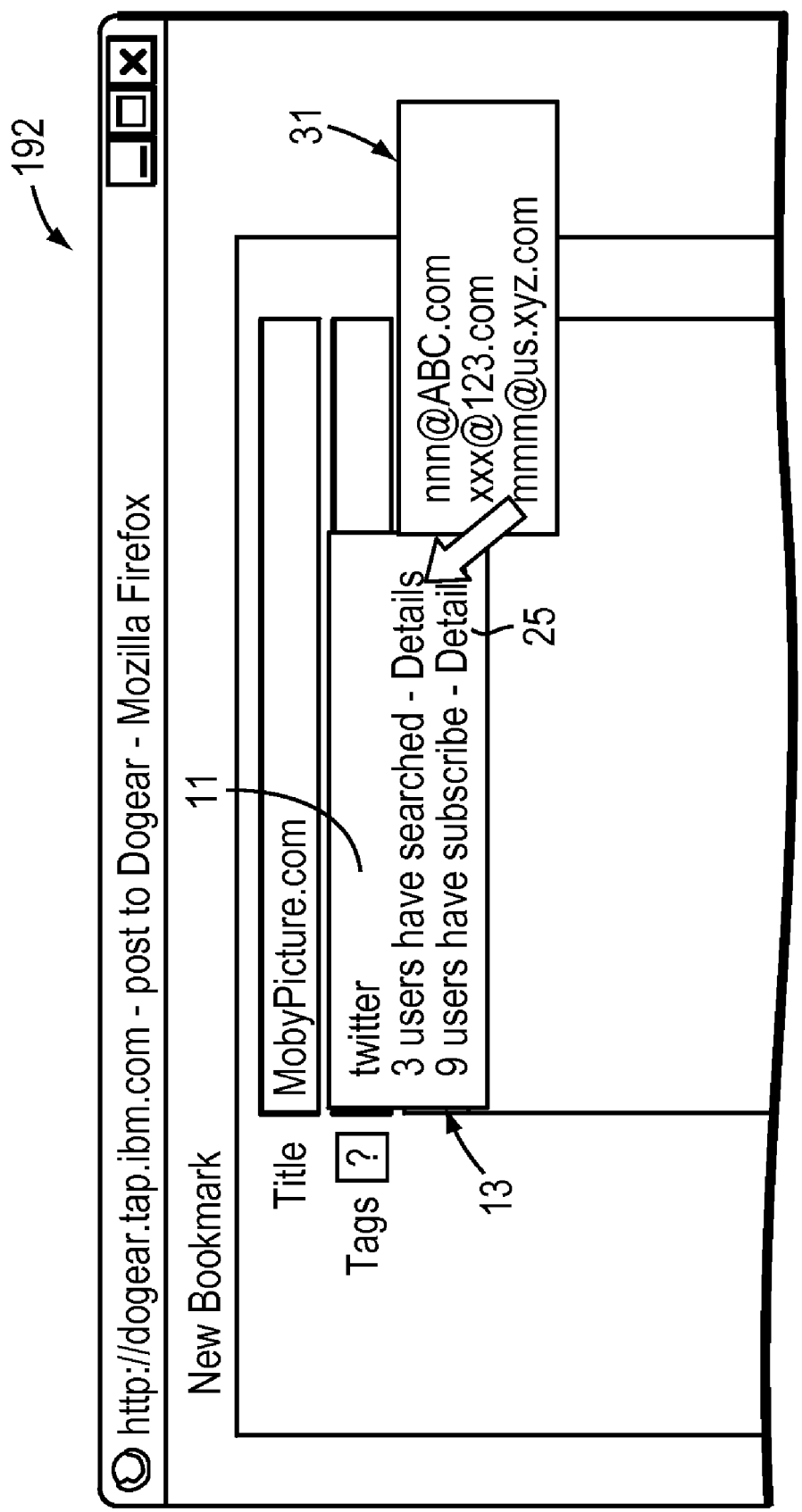

In turn, the user may inspect the resulting list. In the illustration of FIG. 3, the user wants to know which users are interested and may request additional information 31 on one or more users by selecting the "Details" or similar working indicator 25. System 192 is responsive and displays further information 31, such as email addresses and the like of the subject users of the social tagging system.

Figure 4:
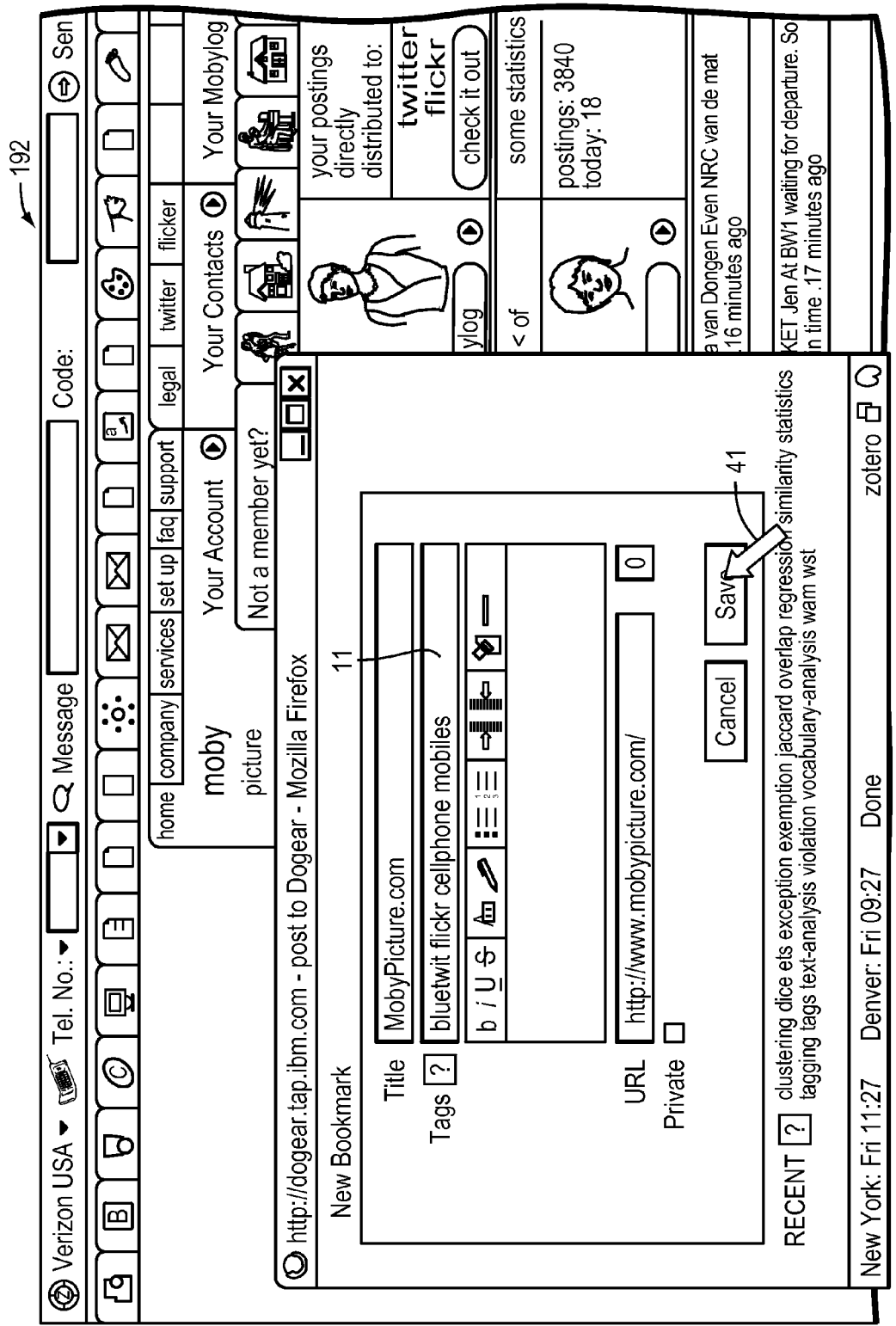

In turn, the user may then optionally revise the candidate tag list 11 (in the example, changing "twitter" to "bluetwit") as shown from FIG. 3 to FIG. 4. Subsequently (eventually) the user may select "Save" 41 to commit the now-revised list of tags 11 as illustrated in FIG. 4. That is, the system 192 provides a pre-commit, preview of user information and other interesting information about a subject candidate tag 11 (FIGS. 1-3). Such preview assists the user in formulating or compiling a tag list before committing to or completing the tagging operation (process).

Figure 5:
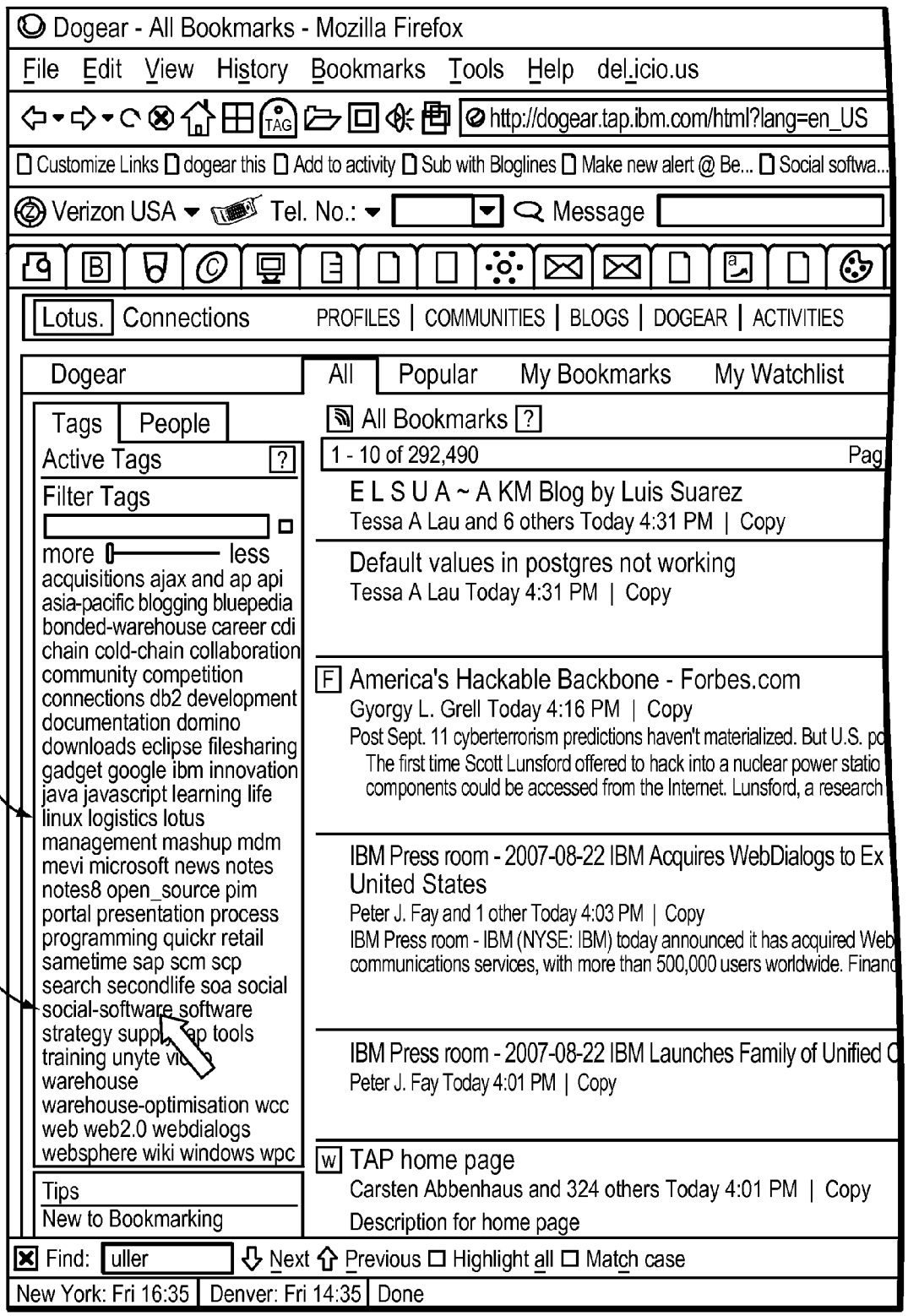
Figure 6:
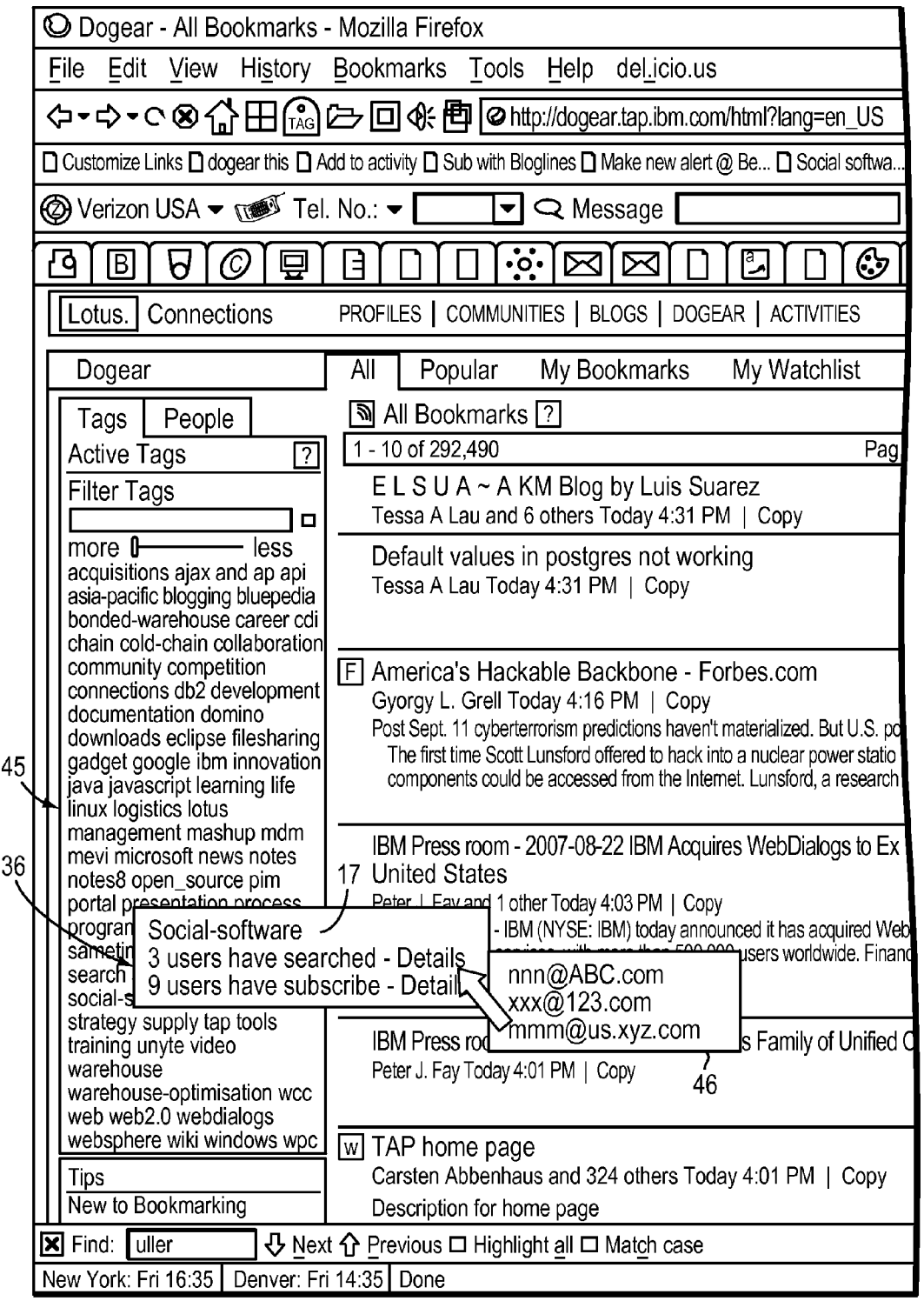

Similarly, the invention system 192 provides to the user a tagcloud 45 (FIG. 5). The user may use the tagcloud 45 to find out about the users associated with a particular tag 17. The invention system 192 enables the user to invoke a similar service to that of FIGS. 2-3 on the tag 17 in the tagcloud 45 (FIG. 6). That is, upon user selection of the tag 17 of interest, the invention system 192 searches database 64 and retrieves tag data (e.g., number of users per variant of tag 17, details of those users etc.). From the retrieved data, system 192 forms and renders working display window 36. Similar to options window/box 13 (FIGS. 2, 3), display window 36 indicates number of users who have inquired about or are interested in subject tag 17, how the users are interested and an option for further details on the users. Upon user selection or request for the further details, system 192 displays the requested details in display box 46 or the like.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/ or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 9A:
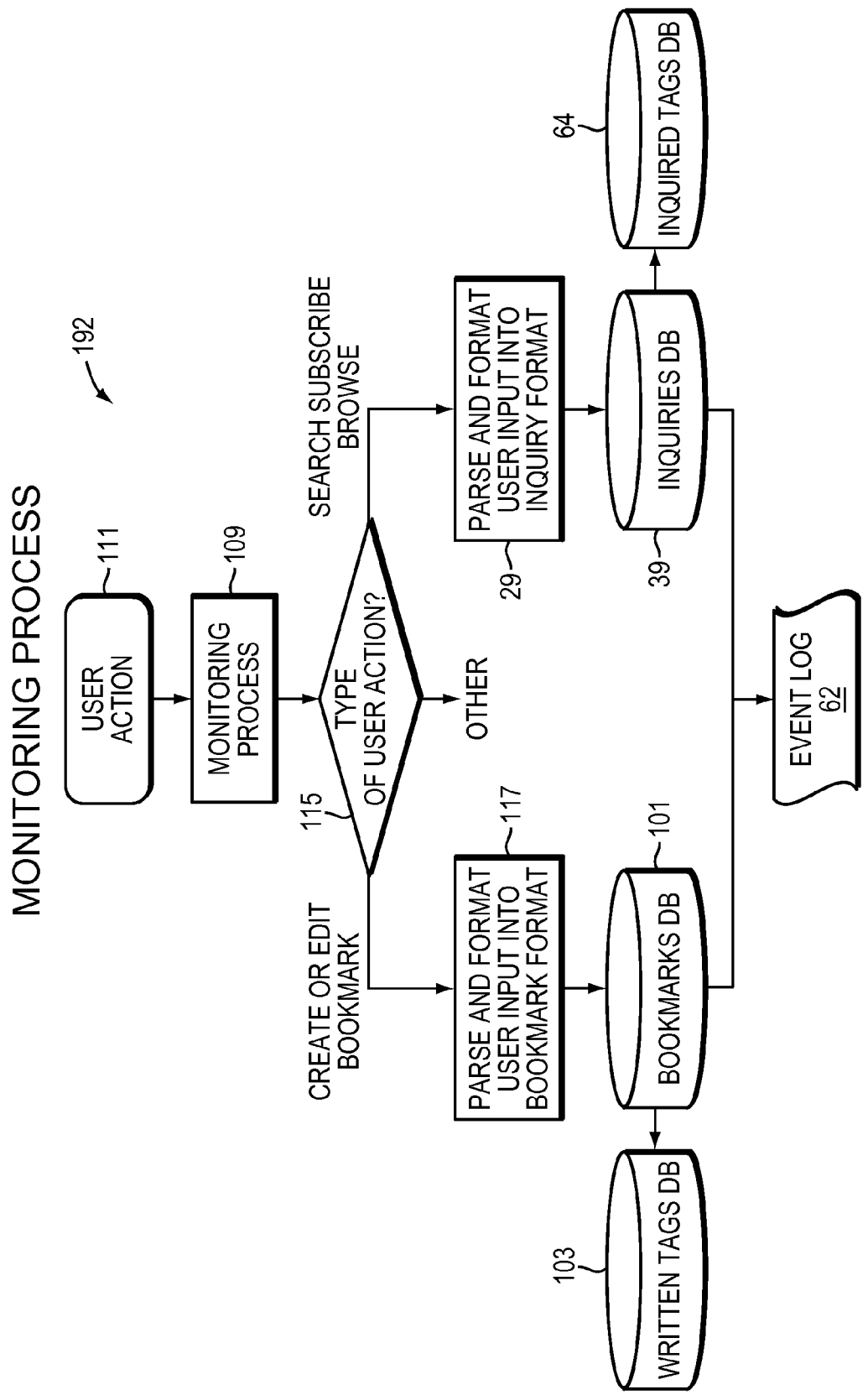
FIGS. 9a-9b are flow diagrams of one embodiment of the present invention.
Figure 9B:
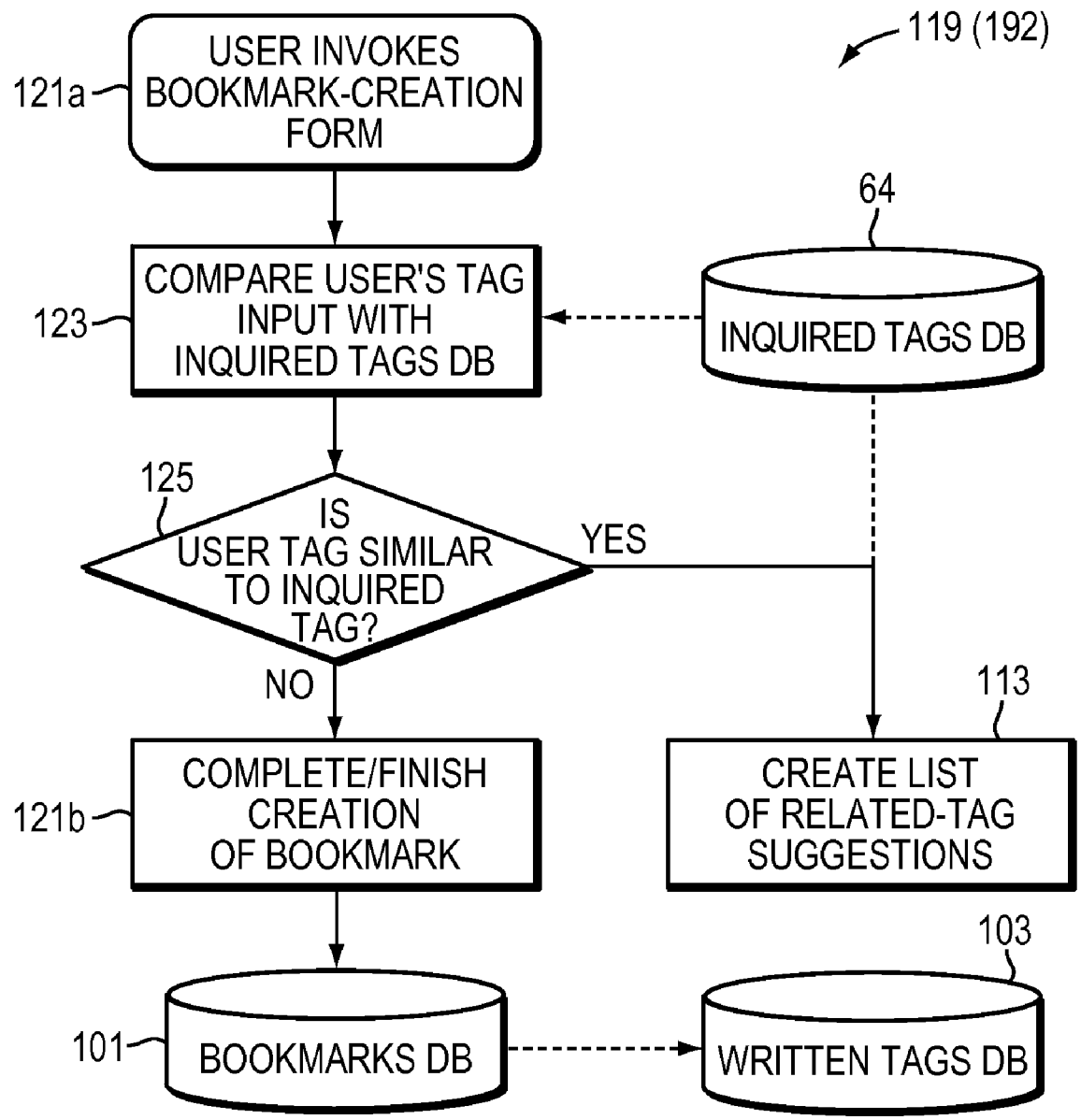

Referring now to the flow diagrams of FIGS. 9a and 9b, one non-limiting example embodiment of the present invention is shown and described. A monitoring process 109 of the invention system 192 is initialized at each on-line session and triggered by user action 111 in the on-line session. The monitoring process 109 monitors and detects user action 111.

In response, monitoring process step 115 determines type of user action 111 detected. If the user action is for creating or editing a bookmark, then step 117 parses and formats the user input into bookmark format. Common bookmark creation techniques are used to implement step 117. The results (created bookmark) are stored in a bookmarks database 101. Records in bookmarks databases 101 each indicate:
  date and time of creation of subject bookmark;
  date and time of last modification of subject bookmark;
  user who created the bookmark;
  tag text; and
  URL of the webpage or other link to the resource to which the tag was applied or otherwise corresponds.
Known or common bookmark database techniques are utilized.

For purposes of searching written tags (for example during a user comparing a potential tag to then existing tags of the bookmarks database 101), the tags of bookmarks database 101 are stored in written tags database 103. Stemming and other common techniques may be employed to accomplish this.

At decision junction 115, if the detected user action is for searching on, subscribing to or browsing by user input tag, then step 29 commences. Step 29 parses and formats the user input into an inquiry format. The resulting inquiry is stored in inquiries database 39. In turn, inquired tags database 64 is updated with tag inquiry (social tagging) data from inquiries database 39. In some embodiments, this database 64 update may include normalizing the tag data, stemming tag data and indexing the tag data by normalized stem.

The user requested search, browse or subscription at 115 is carried out on written tags database 103 using techniques known in the art.

Each of the foregoing user actions is also recorded in event log 62.

Meanwhile, a tag previewer or process 119 (FIG. 9b) is initiated within bookmark-creation or the like. The user invokes the bookmark creation form at 121a and inputs or otherwise selects tag candidates. Prior to user commitment to the candidate tags, step 123 of the tag preview process 119 compares the user's input tag (candidates) with inquired tags database 64. If the candidate tag(s) are similar to inquired tags in database 64, step 113 retrieves from inquired tags database 64 social tagging data or information about how many users, which users and in what form the users have inquired about (searched, browsed, subscribed to) the candidate tag or variants thereof. Step 113 of tag preview module 119, uses the returned information/social tagging data and forms (renders) a display (e.g., option 13, window 36, list of related-tag suggestions or the like). The display may include:
  number of users who have searched or inquired about the subject tag,
  identification of these users, and
  an indication of how each user inquired about/showed interest in the tag (e.g., via subscription, via searches, via browses).

Other display data is suitable. The display may serve as a preview of social data surrounding the subject/candidate tag prior to the user committing to this tag use. Thus, step 113 generates a pre-commit display (option 13, FIG. 2) and/or a browsing-type display (in tagcloud 45 working window 36, FIG. 6). It is noted that the tag preview process 119 does not query the written tags database 103 as is done for comparing tags in prior art processes. Instead the inquired tags database 64 is devised and employed for preview displays/output.

After displaying the foregoing preview, process 119 allows the bookmark creation process to complete (step 121b). That is, where the tag previewer 119 comparator 123 and display step 113 operate prior to user final selection and commitment to using the candidate tag to tag a resource, the system 192 allows the tagging process to continue. In particular, after step 113, system 192 allows the user to adjust and finalize a tag list and commit the tags finally selected for tagging the resource. Upon completion of bookmark creation or other tag creation, the resulting bookmark is stored in bookmarks database 101 and written tags database 103 is updated accordingly.

Tag preview process 119 (FIG. 9B) and monitoring process 109 (FIG. 9A) continue to be triggered and executed throughout the user's on-line session.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer method of social tagging computer resources, comprising:
    in a processor:
        receiving a tag candidate from an end-user commencing input of the tag candidate, the end-user commencing a tagging process;
        in response to the end-user commencing the tagging process, retrieving social tagging data about system user inquiries that have involved the tag candidate, said retrieving being before the end of the tagging process, wherein said social tagging data about system user inquiries include indications of how many and which system users have previously searched for the tag candidate and thus are interested in said tag candidate;
        forming a display of the retrieved social tagging data; and
        rendering the formed display to the end-user in a manner enabling a preview of the retrieved social tagging data during the end-user input of the tag candidate and prior to the end user committing to the tag candidate and ending the tagging process;
    wherein the formed display includes indications to the end-user of:
        number of users who have inquired about the tag candidate, and
        how the users have inquired about the tag candidate; and
    wherein the formed display indications of how the users have inquired about the tag candidate includes indicating: names or numbers of users that have subscriptions to the tag candidate, names or numbers of users that have searched using the tag candidate and names or numbers of users that have browsed using the tag candidate.

2. A computer method as claimed in claim 1 wherein end-user input of the tag candidate is during selection of a tag for tagging a resource;
    the step of rendering the formed display to the end-user is before the end-user commits to tagging the resource with the tag candidate; and
    the method further comprising the step of allowing the end-user to adjust and finalize a tag list tagging the resource.

3. A computer method as claimed in claim 1 wherein end-user input of the tag candidate includes end user browsing of a tag.

4. A computer method as claimed in claim 1 wherein the formed display further includes indication of identities of the users.

5. A computer method as claimed in claim 1 wherein the retrieved social tagging data about the candidate tag includes social tagging information about variants of the candidate tag.

6. A computer method as claimed in claim 5 wherein the variants effectively consider any combination of: plural forms and singular forms of the candidate tag, alternative spellings of the candidate tag, and different grammatical variations of the candidate tag.

7. A computer method as claimed in claim 1 wherein the retrieved social tagging data is from event logs and subscriptions.

8. A computer method as claimed in claim 1 wherein the system user inquiries include browses, searches and subscriptions that have involved the tag candidate.

9. Computer apparatus for social tagging, comprising:
    a data store holding social tagging data from system user inquiries;
    a tag previewer executable by a processor, the tag previewer being coupled to the data store and responsive to an end-user commencing input of a tag candidate, the end-user commencing input of the tag candidate and in response the tag previewer retrieving social tagging data about system user inquiries that have involved the tag candidate, wherein said social tagging data about system user inquiries include indications of how many and which system users have previously searched for the tag candidate and thus are interested in said tag candidate;
    during the end-user input of the tag candidate, the tag previewer forming a display of the retrieved social tagging data; and
    a display monitor coupled to receive the formed display and rendering the formed display to the end-user in a manner enabling a preview of the retrieved social tagging data during the end-user input of the tag candidate and prior to the end-user committing to the tag candidate;
    wherein the formed display includes indications to the end-user of:
        number of users who have inquired about the tag candidate, and
        how the users have inquired about the tag candidate; and
    wherein the formed display indications of how the users have inquired about the tag candidate includes indicating: names or numbers of users that have subscriptions to the tag candidate, names or numbers of users that have searched using the tag candidate and names or numbers of users that have browsed using the tag candidate.

10. A computer method as claimed in claim 9 wherein the system user inquiries include browses, searches and subscription such that the data store holds social tagging data about browsed tags, searched tags and tags subscribed to.

11. A computer apparatus as claimed in claim 9 wherein the end-user input of the tag candidate is during selection of a tag for tagging a resource;
    the display monitor renders the formed display to the end-user before the end-user commits to tagging the resource with the tag candidate; and
    the tag previewer allows the end-user to adjust and finalize a tag list tagging the resource.

12. A computer apparatus as claimed in claim 9 wherein the formed display further includes indication of identities of the users.

13. A computer apparatus as claimed in claim 9 wherein the tag previewer retrieves from the data store social tagging information about one or more variants of the candidate tag, the social tagging data in the data store being normalized and indexed by respective stem of tags.

14. A computer apparatus as claimed in claim 13 wherein the variants effectively consider any combination of: plural forms and singular forms of the candidate tag, alternative spellings of the candidate tag, and different grammatical variations of the candidate tag.

15. A computer apparatus as claimed in claim 9 wherein the data store holds social tagging data from event logs and subscriptions.

16. A computer program product for providing preview of a social tag, the computer program product comprising:
- a nontransitory computer readable storage medium having computer useable program code embodied therewith, the computer usable program code comprising:
- computer usable program code configured for execution by a processor to: receive input from an end-user commencing input of a tag candidate,
- in response to the commencing of input of the tag candidate, retrieve social tagging data about users inquiries that have involved the tag candidate, wherein the users inquiries include any combination of searches, browses and subscriptions to the tag candidate, wherein said social tagging data about system user inquiries include indications of how many and which system users have previously searched for the tag candidate and thus are interested in said tag candidate;
- during the end-user input of the tag candidate, form a display of the retrieved social tagging data; and
- render the formed display to an end-user as a preview of the retrieved social tagging data during the end-user input of the tag candidate and prior to the end-user committing to the tag candidate;
- wherein the formed display includes indications to the end-user of:
  - number of users who have inquired about the tag candidate, and
  - how the users have inquired about the tag candidate; and
- wherein the formed display indications of how the users have inquired about the tag candidate includes indicating: names or numbers of users that have subscriptions to the tag candidate, names or numbers of users that have searched using the tag candidate and names or numbers of users that have browsed using the tag candidate.

17. A computer method as claimed in claim 1 wherein rendering the formed display includes rendering a dialog box proximal to the end-user input of the tag candidate.

18. A computer system of social tagging computer resources, comprising:
- a user interface executable by a processor and receiving from an end-user input of a tag candidate, the end-user inputting the tag candidate commencing a tagging process;
- means for retrieving data, operatively coupled to the user interface and executable by the processor, in response to the end-user commencing the tagging process by inputting the tag candidate, the data retrieval means retrieving social tagging data about system user inquiries that have involved the tag candidate, said retrieving being before the end of the tagging process, wherein said social tagging data about system user inquiries include indications of how many and which system users have previously searched for the tag candidate and thus are interested in said tag candidate;
- processor means for forming a display of the retrieved social tagging data, said forming the display being before the end of the tagging process; and
- display means operatively coupled to the processor for rendering the formed display to the end-user in a manner enabling a preview of the retrieved social tagging data during the end-user input of the tag candidate and prior to the end user committing to the tag candidate and ending the tagging process;
- wherein the formed display includes indications to the end-user of:
  - number of users who have inquired about the tag candidate, and
  - how the users have inquired about the tag candidate; and
- wherein the formed display indications of how the users have inquired about the tag candidate includes indicating: names or numbers of users that have subscriptions to the tag candidate, names or numbers of users that have searched using the tag candidate and names or numbers of users that have browsed using the tag candidate.

* * * * *